United States Patent
Ohya et al.

(10) Patent No.: US 6,377,441 B1
(45) Date of Patent: *Apr. 23, 2002

(54) ELECTRIC DOUBLE-LAYER CAPACITOR WITH COLLECTORS OF TWO OR MORE STACKED COLLECTOR SHEETS

(76) Inventors: Masako Ohya; Yoshiki Inoue, both of c/o NEC Corporation, 7-1, Shiba 5-chome, Minato-ku, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/362,674

(22) Filed: Jul. 29, 1999

(30) Foreign Application Priority Data

Jul. 31, 1998 (JP) .......................... 10-218036

(51) Int. Cl.$^7$ .......................... H01G 9/004; H01G 9/04
(52) U.S. Cl. ........................ 361/502; 361/503
(58) Field of Search ................ 391/502, 503, 391/510, 535

(56) References Cited

U.S. PATENT DOCUMENTS

| | | | |
|---|---|---|---|
| 3,652,902 A | * 3/1972 | Hart et al. | 361/502 |
| 4,394,713 A | * 7/1983 | Yoshida | 361/502 |
| 4,488,203 A | * 12/1984 | Muranaka et al. | 361/502 |
| 4,709,303 A | * 11/1987 | Fujiwara et al. | 361/502 |
| 4,803,597 A | * 2/1989 | Watanabe et al. | 361/502 |
| 5,115,378 A | * 5/1992 | Tsuchiya et al. | 361/502 |

FOREIGN PATENT DOCUMENTS

| | | |
|---|---|---|
| JP | 56-139302 | 9/1956 |
| JP | 63-19611 | 2/1988 |
| JP | 63-181412 | 7/1988 |
| JP | 63-153714 | 11/1988 |
| JP | 2-7684 | 1/1990 |
| JP | 2-305427 | 12/1990 |
| JP | 3-218616 | 9/1991 |
| JP | 3-225811 | 10/1991 |
| JP | 3-102850 | 11/1991 |
| JP | 4-36222 | 3/1992 |
| JP | 4-32529 | 5/1992 |
| JP | 4-206809 | 7/1992 |
| JP | 4-288361 | 10/1992 |
| JP | 5-21273 | 1/1993 |
| JP | 5-315191 | 11/1993 |
| JP | 6-45191 | 2/1994 |
| JP | 7-48453 | 5/1995 |
| JP | 2-696554 | 9/1997 |

* cited by examiner

Primary Examiner—Dean A. Reichard
Assistant Examiner—Eric W Thomas
(74) Attorney, Agent, or Firm—Sughrue Mion, PLLC

(57) ABSTRACT

An electric double-layer capacitor has a porous separator, a pair of polarizable electrodes confronting each other with the separator interposed therebetween, and an electrolytic solution, all accommodated in a gasket frame. The separator is electrically non-conductive and ion-permeable, and is impregnated with the electrolytic solution. The gasket frame has an opening sealed by a collector held against the surface of the polarizable electrode which faces away from the separator. The collector which seals the opening in the gasket frame comprises two laminated collector sheets. Since there is almost no possibility that both the two laminated collector sheets will crack or break, the electrolytic solution is reliably prevented from leaking out of the gasket.

17 Claims, 10 Drawing Sheets

Fig. 9
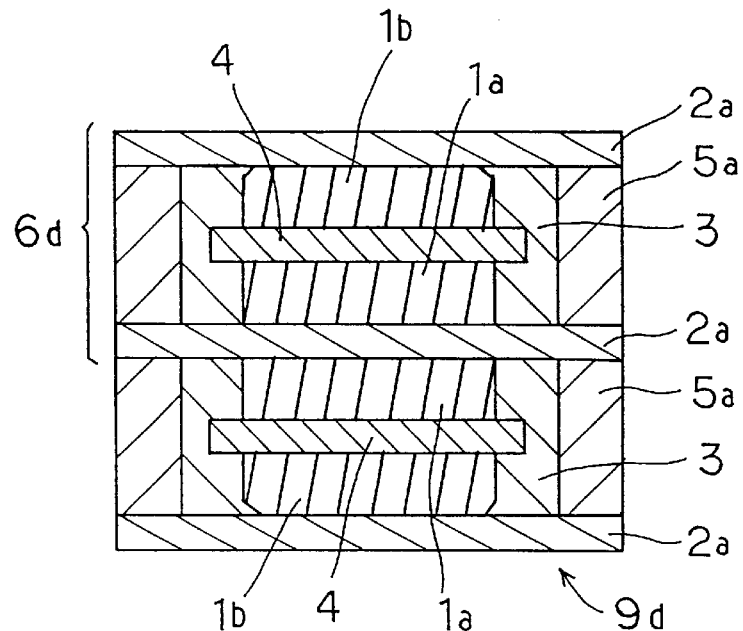
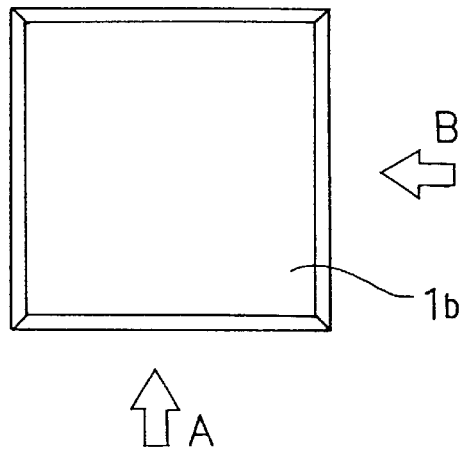
Fig. 10A
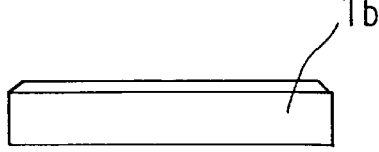
Fig. 10B
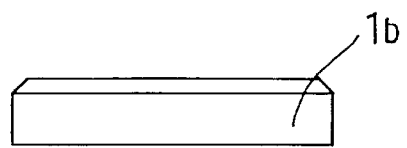
Fig. 10C

ELECTRIC DOUBLE-LAYER CAPACITOR WITH COLLECTORS OF TWO OR MORE STACKED COLLECTOR SHEETS

BACKGROUND OF THE INVENTION

1. Field of the Invention

The present invention relates to an electric double-layer capacitor, and more particularly to a large-capacity electric double-layer capacitor having solid polarizable electrodes.

2. Description of the Related Art

As shown in FIG. 1 of the accompanying drawings, a conventional electric double-layer capacitor comprises a cell stack 109 comprising a plurality of basic cells 106, a pair of pressure plates 107, and a pair of terminal electrodes 108.

As shown in FIG. 2 of the accompanying drawings, each of the basic cells 106 comprises a pair of polarizable electrodes 101 disposed in confronting relationship to each other with a porous, electrically non-conductive, ion-permeable separator 104 interposed therebetween, and housed within a frame-shaped gasket frame 105. Collectors 102 are joined respectively to the upper and lower surfaces of the gasket frame 105, closing the openings defined in the upper and lower surfaces thereof. The separator 104 and the polarizable electrodes 101 are thus sealed within the gasket frame 105. The collectors 102 are held against those surfaces of the polarizable electrodes 101 which face away from the separator 104. Together with the separator 104 and the polarizable electrodes 101, an electrolytic solution 103 is sealed in the gasket frame 105. The separator 104 is impregnated with the electrolytic solution 103 thus sealed in the gasket frame 105.

As shown in FIGS. 3A, 3B, and 3C of the accompanying drawings, each of the polarizable electrodes 101 is in the form of a rectangular plate. The polarizable electrodes 101 are made of solid activated carbon mainly comprising a compound of a powder or fibers of activated carbon and a polyacene material.

The collectors 102 are made of rubber or plastics containing electrically conductive carbon. The collectors 102 are attached under pressure to the polarizable electrodes 101.

As shown in FIGS. 4A, 4B, and 4C of the accompanying drawings, each of the gasket frames 105 is in the form of a hollow frame with openings defined in respective upper and lower surfaces thereof.

The dielectric strength of the electric double-layer capacitor is limited by the electrolytic voltage of the electrolytic solution 103. Therefore, depending on the dielectric strength which is required by the electric double-layer capacitor, a certain number of basic cells 106 are connected in series with each other, providing the cell stack 109. The terminal electrodes 108 are attached to the respective opposite ends of the cell stack 109 in the direction in which the basic cells 106 are stacked. The pressure plates 107 are attached to those surfaces of the terminal electrodes 108 which face away from the cell stack 109. Pressure plates 107 are pressed toward each other, and remain under a constant pressure for pressing the adjacent basic cells 106 against each other and also for pressing terminal electrodes 108 against adjacent basic cells 106 for thereby reducing contact resistances across contacting surfaces of the parts of the electric double-layer capacitor.

Polarizable electrodes 101, which have recently been employed in the art, are effective for increasing the capacity of the electric double-layer capacitor and reduce the equivalent series resistance of the electric double-layer capacitor. This increased capacity and reduced equivalent series resistance have led to new applications for the electric double-layer capacitor. Such new applications include a power supply for energizing an automobile starter motor in combination with a lead storage battery, and an auxiliary power supply combined with a solar cell.

In applications of the electric double-layer capacitor, the electric double-layer capacitor is highly likely to be installed in a high-temperature environment. Accordingly, it is necessary to keep the electric double-layer capacitor highly reliable in high-temperature usage. However, when a test is conducted in a high-temperature environment to evaluate the reliability of the conventional electric double-layer capacitor shown in FIG. 1, basic cells 106 are expanded because electrolytic solution 103 is expanded with heat and gases are produced from cell stack 109 by the application of a voltage. The effect which the expansion of the basic cells 106 has on each of the collectors 102 of the cell stack 109 is greater on the collectors 102 that are close to the ends of the cell stack 109 than on the collectors 102 in the central region of the cell stack 109. Particularly, the outermost collectors 102 are subject to the greatest load from the expansion of basic cells 106. Therefore, when the electric double-layer capacitor is placed in a high-temperature environment for a long period of time, the outermost collectors 102 tend to crack or break, allowing the electrolytic solution 103 to leak from the outermost basic cells 106.

In applications which require an electric double-layer capacitor to produce greater electric power, e.g., if an electric double-layer capacitor is used to energize an automobile starter motor, the electric double-layer capacitor needs to have a low equivalent series resistance. In order to reduce the equivalent series resistance of the electric double-layer capacitor shown in FIG. 1, the polarizable electrodes 101 and the collectors 102 may be electrically connected for good conductivity. For this reason, cell stack 109 is pressed by the pressure plates 107, each in the shape of a less deformable, highly rigid metal plate, applied to the outermost collectors 102 of cell stack 109.

However, collectors 102, which are made of electrically conductive rubber, are not rigid. Therefore, when cell stack 109 is pressed by pressure plates 107, collectors 102 are subjected to strong local forces. Polarizable electrodes 101 are made of sintered activated carbon, and hence are hard and highly rigid. Gasket frames 105 are often made of a hard material such as ABS resin so that they have high dimensional accuracy. Consequently, when cell stack 109 is pressed by metallic pressure plates 107 on the opposite ends of cell stack 109, outermost collectors 102 are liable to crack due to contact with sharp portions, such as edges, of polarizable electrodes 101 and gasket frames 105. As a result, when electric double-layer capacitors are manufactured, defective electric double-layer capacitors are produced with greater probability, and the productivity of electric double-layer capacitors is reduced.

An electric double-layer capacitor proposed in an attempt to solve the above problems is disclosed in Japanese Patent Laid-Open Publication No. 315191/93, for example. This disclosed electric double-layer capacitor comprises a cell stack of basic cells similar to basic cells 106 shown in FIGS. 1 and 2, with outermost collectors thicker than inner collectors.

Japanese Patent Publication No. 32529/92 discloses an electric double-layer capacitor comprising a cell stack of basic cells having collectors each in the form of a single electrically conductive polyethylene film. The electrically conductive polyethylene film is fabricated by filling carbon black with polyethylene at successively different densities. Specifically, the polyethylene in the electrically conductive polyethylene film is provided in three layers having successively low, high, and low densities across the thickness of the electrically conductive polyethylene film. Collectors thus constructed are mechanically strong and positioned as outermost collectors of the cell stack. Inasmuch as the strong outermost collectors are resistant to crack or breakage, the electrolytic solution is prevented from leaking out of the outermost basic cells.

Japanese Publication No. 36222/92 discloses an electric double-layer capacitor comprising a cell stack of basic cells having collectors each in the form of an electrically conductive sheet with a core disposed therein. Collectors thus constructed are mechanically strong and positioned as outermost collectors of the cell stack. The outermost collectors are thus resistant to crack or breakage, and the electrolytic solution is prevented from leaking out of the outermost basic cells.

However, the above conventional electric double-layer capacitors are disadvantageous in that it is difficult to increase the productivity of the electric double-layer capacitors and maintain the reliability of the electric double-layer capacitors. Reasons for these shortcomings will be described below.

According to Japanese Patent Laid-Open Publication No. 315191/93, the outermost collectors are thicker than the inner collectors of the cell stack, and the reliability of the electric double-layer capacitor is high because the mechanical strength of the outermost collectors is large. However, since each of the outermost collectors is in the form of a single sheet, if a crack or pinhole happens to be developed somewhere in any of the outermost collectors, then the crack or pinhole tends to be gradually enlarged in size, allowing the electrolytic solution to leak out of the corresponding outermost basic cell. Accordingly, the electric double-layer capacitor lacks a sufficient level of reliability. Another problem with the thicker collectors is that it is difficult to find any pinholes produced in the thicker collectors, resulting in an increased number of defective electric double-layer capacitors being produced.

According to Japanese Patent Publication No. 32529/92, an electrically conductive polyethylene film for use as a collector has a three-layer structure of carbon black filled with three layers of polyethylene having successively low, high, and low densities. Sulfuric acid is diffused at a low rate into the high-density layer of polyethylene. The low-density layers of polyethylene have soft surface layers which tend to have a low contact resistance. Even though the collector is of the three-layer structure, it is in the form of a single sheet, and is liable to start cracking from any region which is mechanically weaker than other regions. As a consequence, the electric double-layer capacitor does not have a sufficient level of reliability.

According to Japanese Utility Model Laid-open Publication No. 36222/92, each collector is in the form of an electrically conductive sheet with a core embedded therein for increased mechanical strength. The collector disclosed is problematic in that depending on the material of the core, the core may break the collector or degrade the characteristics of the electric double-layer capacitor. For example, if the core in the electrically conductive sheet comprises a metal foil, then since the metal foil is mechanically stronger than the electrically conductive sheet, the metal foil may possibly cause damage to the electrically conductive sheet when bending stresses, for example, are applied to the collector while the collector is being poorly handled. Though the metal foil itself has a low resistance, the contact resistance across the interface between the metal foil and a member of rubber or synthetic resin is high when the metal foil is superposed on the member of rubber or synthetic resin. As a result, the electric double-layer capacitor suffers an increase in the equivalent series resistance and hence fails to have good characteristics. When a pinhole or crack is developed in a surface of the electrically conductive sheet of a collector which faces the polarizable electrode, the electrolytic solution in the basic cell leaks through the pinhole or crack and reaches the metal foil in the electrically conductive sheet. The electrolytic solution then gradually corrodes the metal foil, and when a material produced by the corrosion of the metal foil enters the basic cell, it causes harmful reactions tending to emit gases. Therefore, the core of the collector tends to adversely affect the reliability of the electric double-layer capacitor. Even if the core embedded in the electrically conductive sheet is made of an electrically conductive synthetic resin, rather than metal, inasmuch as the material of the core is different from the material of the electrically conductive sheet, the contact resistance across the contacting surfaces of the electrically conductive sheet and the core increases. Consequently, the reliability of the electric double-layer capacitor remains relatively low.

SUMMARY OF THE INVENTION

It is therefore an object of the present invention to provide an electric double-layer capacitor which has separators, polarizable electrodes, and an electrolytic solution reliably sealed in gasket frames, includes collectors resistant to breakage and hence leakage of the electrolytic solution from basic cells, can be manufactured with high productivity, and is highly reliable when used in a high-temperature environment.

According to an aspect of the present invention, a gasket frame housing a separator and a pair of polarizable electrodes disposed in confronting relation to each other with the separator interposed therebetween has an opening sealed by a collector comprising two laminated collector sheets. Since there is almost no possibility that both the two laminated collector sheets of the collector will crack or break, it is possible to keep an electrolytic solution sealed, together with the separator and the polarizable electrodes, in the gasket frame and seal the opening in the gasket frame with the collector. The percentage of defective electric double-layer capacitors is lowered, and the productivity of electric double-layer capacitors is increased. Even when the temperature of the electric double-layer capacitor increases to expand the components in the gasket frame to such an extent that the collector is deformed, there is almost no possibility that both the two laminated collector sheets will crack or break. Consequently, inasmuch as the mechanical strength of the collector is high when the collector is deformed, the electric double-layer capacitor has a long service life and a high level of reliability.

According to another aspect of the present invention, each of the collectors on the outermost surfaces of a stack of basic cells comprises two laminated collector sheets. Each of the basic cells comprises a separator, a pair of polarizable electrodes disposed in confronting relation to each other with the separator interposed therebetween, a gasket frame accommodating the separator and the polarizable electrodes, and a collector sealing the opening in the gasket. Because there is almost no possibility that both the two laminated collector sheets of the outermost collectors will crack or break, the opening in the gasket frame is reliably sealed by the collector. Consequently, the productivity and reliability of electric double-layer capacitors are high. When the components in the basic cells are expanded in a high-temperature environment, the outermost collectors of the stack are deformed to the greatest degree between the collectors of the basic cells. However, since each of the outermost collectors comprises two laminated collector sheets, any possibility that all the laminated collector sheets will crack or break is almost nil. Therefore, the separator and the polarizable electrodes remain reliably sealed in each of the outermost basic cells of the stack in a high-temperature environment. In some applications, terminal electrodes are attached to the outermost ends of the stack, and the outermost collectors of the stack are pressed. Even in such a case, inasmuch as it is not likely for all the laminated collector sheets of the outermost collector to crack or break under the pressure, the productivity and reliability of electric double-layer capacitors are high.

The above and other objects, features, and advantages of the present invention will become apparent from the following description with reference to the accompanying drawings which illustrate examples of the present invention.

BRIEF DESCRIPTION OF THE DRAWINGS

FIG. 9 is a cross-sectional view of two basic cells of an electric double-layer capacitor according to a fourth embodiment of the present invention;

FIG. 10A is a plan view of a polarizable electrode held against an outermost collector of a cell stack shown in FIG. 9;

FIG. 10B is a side elevational view as viewed in the direction indicated by the arrow A in FIG. 10A;

FIG. 10C is a side elevational view as viewed in the direction indicated by the arrow B in FIG. 10A;

DETAILED DESCRIPTION OF THE PREFERRED EMBODIMENTS

1st Embodiment

Figure 1:
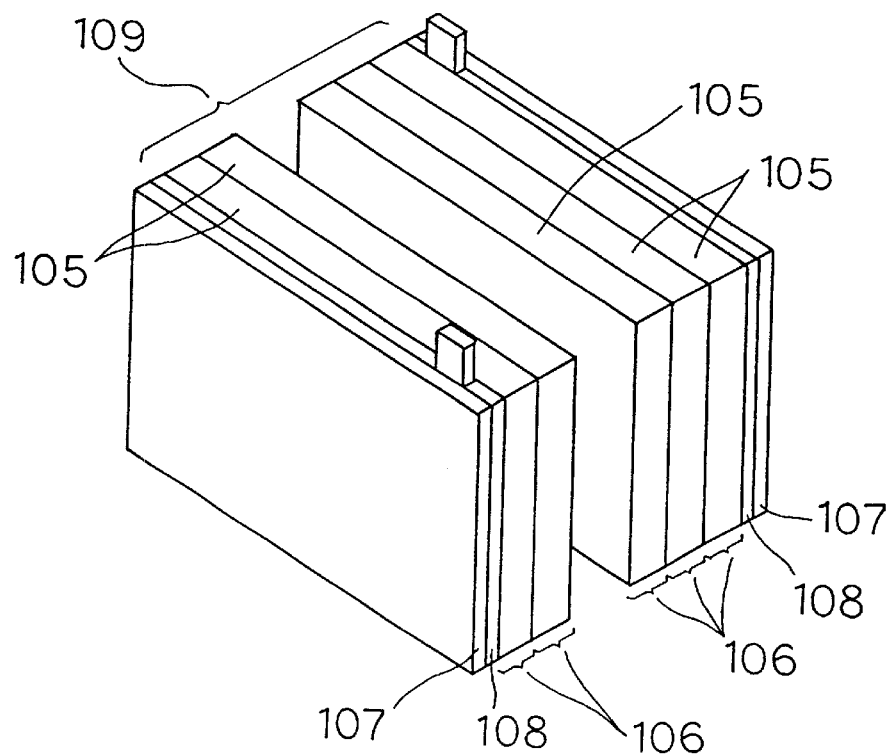
FIG. 1 is a perspective view of a conventional electric double-layer capacitor.
Figure 2:
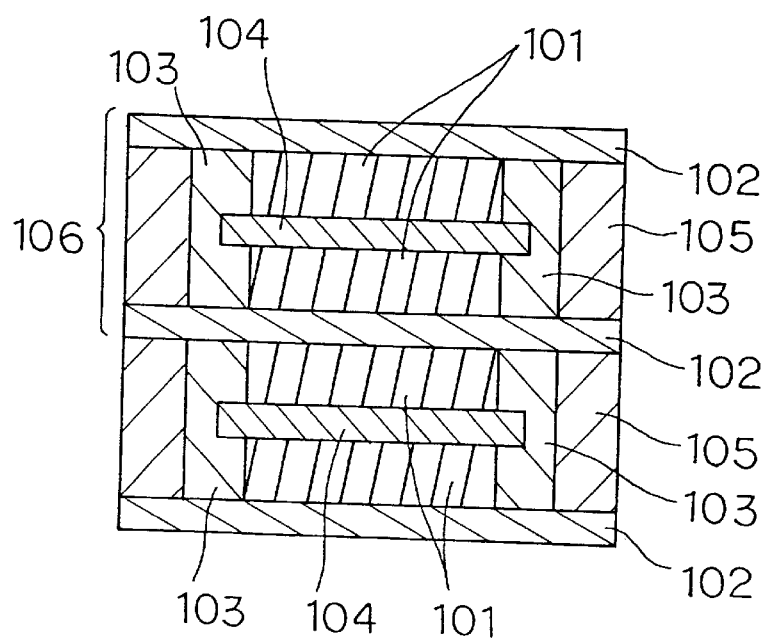
FIG. 2 is a cross-sectional view of basic cells of the conventional electric double-layer capacitor shown in FIG. 1.
Figure 3A:
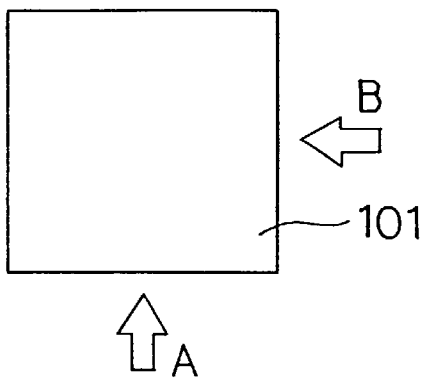
FIG. 3A is a plan view of a polarizable electrode in each of the basic cells shown in FIG. 2.
Figure 3B:
FIG. 3B is a side elevational view as viewed in the direction indicated by the arrow A in FIG. 3A.
Figure 3C:
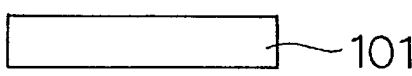
FIG. 3C is a side elevational view as viewed in the direction indicated by the arrow B in FIG. 3A.
Figure 4A:
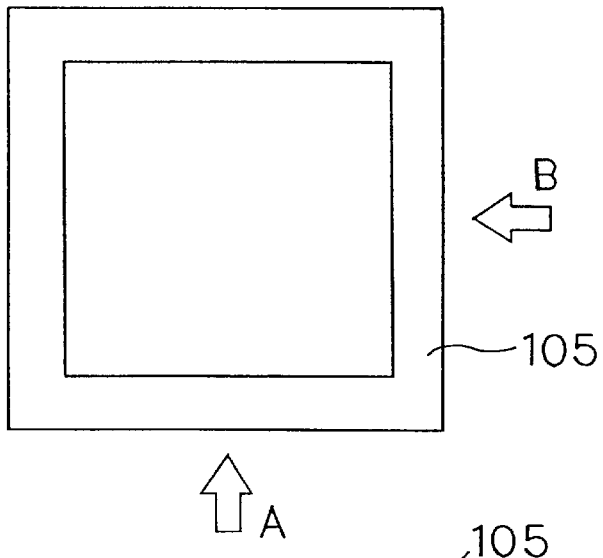
FIG. 4A is a plan view of a gasket frame of the electric double-layer capacitor shown in FIGS. 1 and 2.
Figure 4B:
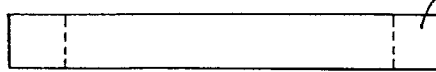
FIG. 4B is a side elevational view as viewed in the direction indicated by the arrow A in FIG. 4A.
Figure 4C:
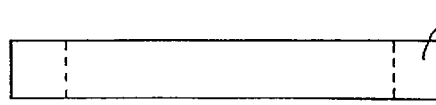
FIG. 4C is a side elevational view as viewed in the direction indicated by the arrow B in FIG. 4A.
Figure 5:
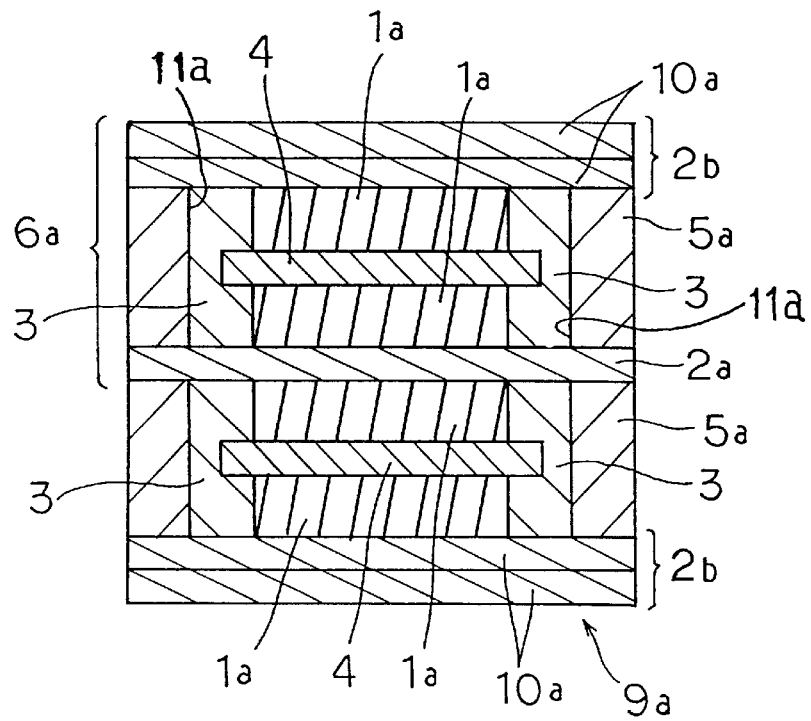
FIG. 5 is a cross-sectional view of two basic cells of an electric double-layer capacitor according to a first embodiment of the present invention.

Referring now to FIG. 5, there is shown a cell stack 9a comprising two stacked basic cells 6a of an electric double-layer capacitor according to a first embodiment of the present invention. As shown in FIG. 5, each of the basic cells 6a comprises a porous, electrically non-conductive, ion-permeable separator 4 and a pair of polarizable electrodes 1a disposed in confronting relationship to each other with the separator 4 interposed therebetween, separators 4 and polarizable electrodes 1a being housed between frame-shaped gasket frame 5a. A sheet-like collector 2a is joined to gasket frame 5a. Another collector 2b is joined to gasket frame 5a. The collector 2b comprises two collector sheets 10a, each identical to the sheet-like collector 2a, which are integrally laminated by being pressed together. Together with the separator 4 and the polarizable electrodes 11, an electrolytic solution 3 is sealed in the gasket frame 5a. The separator 4 is impregnated with the electrolytic solution 3 thus sealed inside the gasket frame 5a.

The separator 4, the pair of polarizable electrodes 1a, the electrolytic solution 3, the gasket frame 5a, and the collectors 2a, 2b jointly make up each basic cell 6a. The two basic cells 6a are stacked in the direction in which the separator 4 and the polarizable electrodes 1a are juxtaposed, making up the cell stack 9a. The collectors 2b of the respective basic cells 6a are disposed on respective outermost surfaces of the cell stack 9a. The collector 2a sandwiched between the two gasket frames 5a is shared by the two basic cells 6a.

Each of the polarizable electrodes 1a is in the form of a block of activated carbon which is produced by firing a mixture of a powder of activated carbon and a binder such as phenolic resin or the like. A binder of another material may be employed, and the polarizable electrodes 1a may be manufactured in any of various other processes.

The gasket frame 5a houses the polarizable electrodes 1a, the separator 4, and the electrolytic solution 3 therein, and the collectors 2a, 2b are attached to the gasket frame 5a. The gasket frame 5a may be made of an insulating material such as plastics. In this embodiment, the gasket frame 5a is made of heat-resistant ABS resin.

Both collector 2a and the collector sheets 10a of collector 2b are in the form of a sheet of butyl rubber with a carbon powder kneaded therein. The separator 4 may be made of any electrically non-conductive, ion-permeable material. In this embodiment, the separator 4 comprises a glass fiber separator of the type which is used in lead storage batteries.

Basic cells 6a are manufactured as follows: The separator 4 and the polarizable electrodes 1a are placed into the gasket frame 5a such that the polarizable electrodes 1a confront each other with the separator 4 interposed therebetween. Then, the electrolytic solution 3 is poured into the polarizable electrodes 1a and the separator 4. Thereafter, one of the openings 11a in the gasket frame 5a is covered with the collector 2b, and the other opening 11a is covered with the collector 2a, thus completing the basic cell 6a.

As described above, each of the outermost collectors 2b of the cell stack 9a comprises two laminated collector sheets 10a. The possibility that both the two collector sheets 10a will crack or break is almost nil. Consequently, the electrolytic solution 3 in the basic cells 6a is reliably prevented from leaking out of the basic cells 6a.

Figure 6:
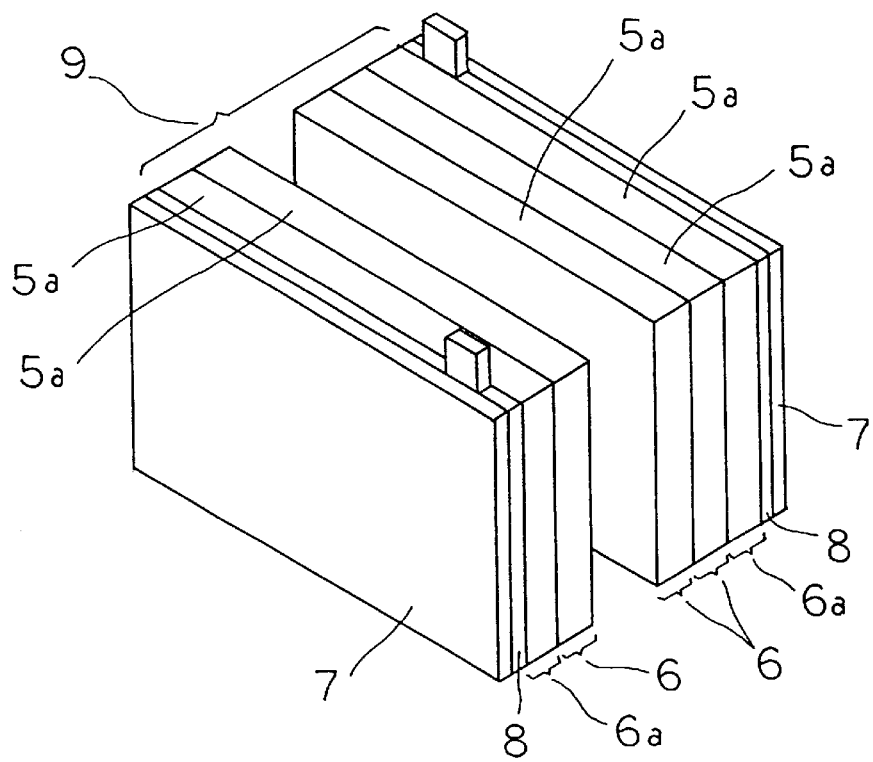
FIG. 6 is a fragmentary perspective view of the electric double-layer capacitor according to the first embodiment.

As shown in FIG. 6, the electric double-layer capacitor according to the first embodiment comprises a cell stack 9, a pair of terminal electrodes 8, and a pair of pressure plates 7. The cell stack 9 comprises a series of 16 basic cells 6 stacked together, with the basic cells 6a disposed respectively on the opposite ends of the stack of the basic cells 6. Basic cells 6 are similar to basic cells 6a except that collector 2b is replaced with collector 2a attached to the gasket frame 5a. Specifically, each basic cell 6 comprises a separator 4, a pair of polarizable electrodes 1a, and an electrolytic solution 3 which are housed in a gasket frame 5a, and a pair of collectors 2a attached to the opposite ends of the gasket frame 5a. Therefore, the cell stack 9 comprises a total of 18 basic cells including 16 basic cells 6 and two basic cells 6a. The collectors 2b of the basic cells 6a are disposed on outermost surfaces of the cell stack 9. Consequently, the collectors 2b, each comprising two collector sheets 10a, are mounted on the opposite ends of the cell stack 9 in the direction in which the basic cells are stacked.

The terminal electrodes 8 are attached to the surfaces of the opposite ends of the cell stack 9 in the direction in which the basic cells are stacked. The opposite ends of the cell stack 9 are electrically connected parallel to each other through the terminal electrodes 8. The pressure plates 7 are attached to the surfaces of the terminal electrodes 9 which face away from the cell stack 9. The pressure plates 7 apply a pressure to the cell stack 9 and the terminal electrodes 8 in a direction to compress the cell stack 9.

In the first embodiment, each of the polarizable electrodes 1a has a length of 70 mm, a width of 50 mm, and a thickness of 5 mm. The hollow space in each of the gasket frames 5a has a length of 74 mm, a width of 54 mm, and a thickness of 10.2 mm. Each of the separators 4 has a length of 70 mm, a width of 50 mm, and a thickness of 0.2 mm. Each of the collectors 2a has a length of 82 mm, a width of 62 mm, and a thickness of 0.1 mm. Each of the collectors 2b is held in contact with the terminal electrodes 8 comprises two collectors identical to collectors 2a and are integrally laminated together under pressure.

16 basic cells 6 and two basic cells 6a are stacked in series with each other, making up a cell stack 9 having a dielectric strength of 15 V.

30 weight % of diluted sulfuric acid is used as the electrolytic solution 3. One of the polarizable electrodes 1a in each of the basic cells 6 is made by mixing a phenolic powder of activated carbon and a powder of phenolic resin having the same phenolic component as the powder of activated carbon at a weight ratio of 70:30, grinding, granulating, and firing the mixture.

According to the first embodiment, as described above, each of the outermost collectors 2b of the cell stack 9 comprises two collector sheets 10b laminated together by pressing. Since the possibility that both collector sheets 10a will crack or break is almost nil, the openings 11a in the gasket frames 5a are reliably sealed by the collectors 2b. Consequently, the electrolytic solution 3 is prevented from leaking out of the basic cells 6a. Defective electric double-layer capacitors are prevented from being manufactured, and hence the productivity of electric double-layer capacitors is increased. Even when the components in the gasket frames 5a are expanded in a high-temperature environment, deforming the collectors 2b, it is almost impossible for both collector sheets 10a to crack or break, so that the collectors 2b have an increased mechanical strength. As a result, the electric double-layer capacitor has an extended service life and is highly reliable.

In the first embodiment, the collectors 2b are disposed on only the outermost surfaces of the cell stack 9. However, collectors 2b may also be positioned within the cell stack 9.

In the first embodiment, each of the collectors 2b comprises two laminated collector sheets 10a. However, each of the collectors 2b may comprise three or more laminated collector sheets 10a.

2nd Embodiment

Figure 7:
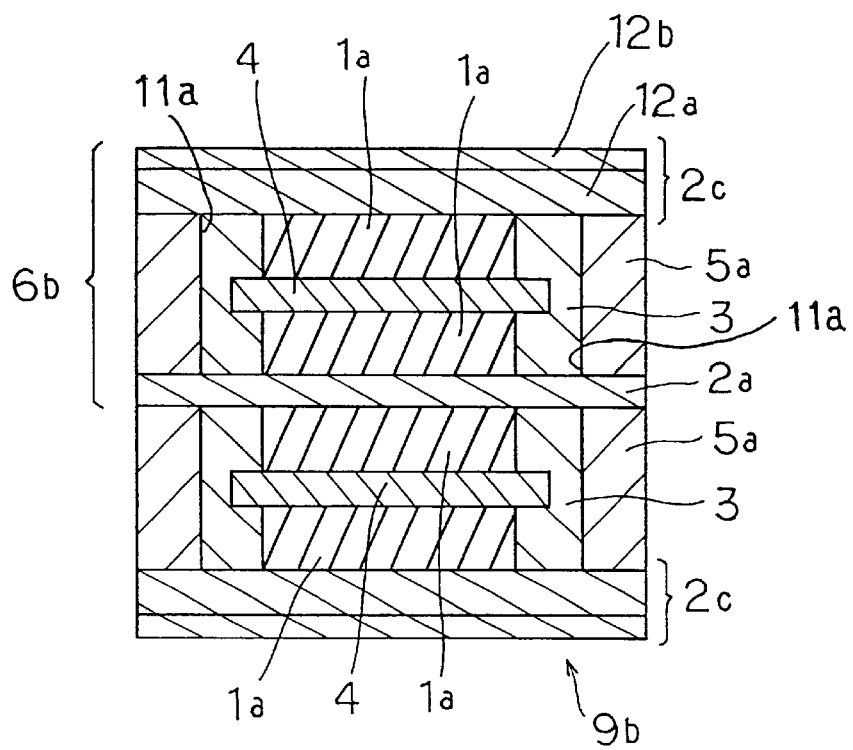
FIG. 7 is a cross-sectional view of two basic cells of an electric double-layer capacitor according to a second embodiment of the present invention.

FIG. 7 shows a cell stack 9b comprising two stacked basic cells 6b of an electric double-layer capacitor according to a second embodiment of the present invention.

The parts of cell stack 9b shown in FIG. 7 which are identical to those of the first embodiment are denoted by identical reference characters. Only the details of cell stack 9b different from the first embodiment will be described below.

As shown in FIG. 7, each of the basic cells 6b has a collector 2c, in place of the collector 2b in the first embodiment, attached to a surface of the gasket frame 5a. The collector 2c comprises a collector sheet 12a and a collector sheet 12b thinner than the collector sheet 12a, the collector sheets 12a, 12b laminated together by pressing. The collector sheet 12a has a length of 82 mm, a width of 62 mm, and a thickness of 0.15 mm, and the collector sheet 12b has a length of 82 mm, a width of 62 mm, and a thickness of 0.05 mm.

16 basic cells 6 are stacked in series with each other, and two basic cells 6b are disposed on respective opposite ends of the stack of the basic cells 6, making up a cell stack having a dielectric strength of 15 V. The basic cells 6b are stacked such that the collectors 2c are positioned on the outermost surfaces of the stack of the basic cells 6. Terminal electrodes 8 and pressure plates 7 are attached to opposite ends of the cell stack, thereby completing the electric double-layer capacitor according to the second embodiment.

Even though each of the outermost collectors 2c of the cell stack comprises two collector sheets 12a, 12b having different thicknesses, there is almost no possibility that both collector sheets 12a, 12b will crack or break. Therefore, the outermost collectors 2c are effective to increase the productivity of electric double-layer capacitors and make the electric double-layer capacitors highly reliable.

3rd Embodiment

Figure 8:
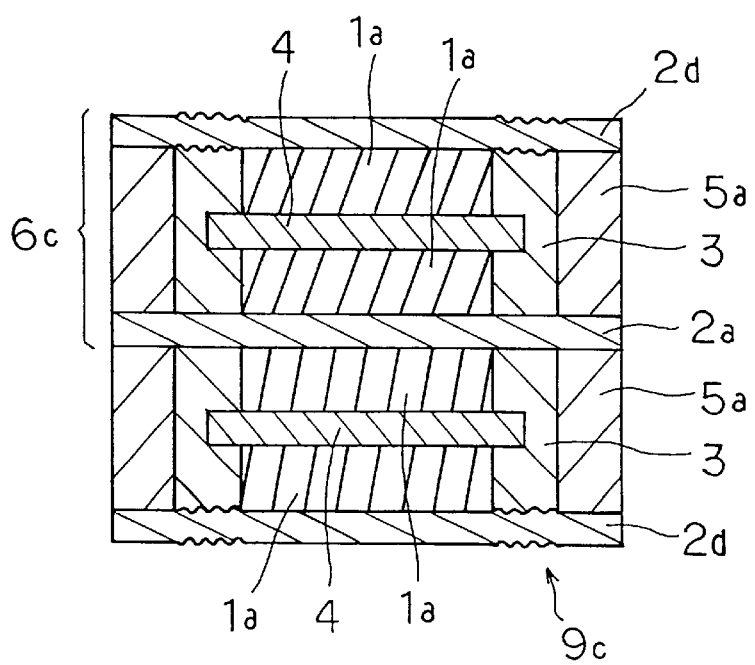
FIG. 8 is a cross-sectional view of two basic cells of an electric double-layer capacitor according to a third embodiment of the present invention.

FIG. 8 shows a cell stack 9c comprising two stacked basic cells 6c of an electric double-layer capacitor according to a third embodiment of the present invention.

The parts of cell stack 9c shown in FIG. 8 which are identical to those of the first embodiment are denoted by identical reference characters. Only the details of the cell stack 9c different from the first embodiment will be described below.

As shown in FIG. 8, each basic cell 6c has a collector 2d in place of collector 2b in the first embodiment attached to a surface of gasket frame 5a. Collector 2d is larger than the collector 2a disposed within the cell stack 9c, and has a length of 83.0 mm, a width of 63.0 mm, and a thickness of 0.1 mm. Other components of the cell stack 9c have the same shapes and dimensions as those of the first embodiment.

The electric double-layer capacitor according to the second embodiment is manufactured as follows: When each collector 2d is attached to the corresponding gasket frame 5a, the outermost collector 2d is slackened between the portion held against the polarizable electrode 1a and the portion held against the gasket frame 5a. Other details and conditions of the process of manufacturing the electric double-layer capacitor according to the second embodiment are the same as those of the first embodiment.

16 basic cells 6 are stacked in series, and two basic cells 6c are disposed on the opposite ends of the stack of basic cells 6, making up a cell stack having a dielectric strength of 15 V. Basic cells 6c are stacked such that the collectors 2d are positioned on the outermost surfaces of the stack of the basic cells 6. Terminal electrodes 8 and pressure plates 7 are attached to opposite ends of the cell stack, thereby completing the electric double-layer capacitor according to the third embodiment.

Since outermost collectors 2d are partly slackened, collectors 2d are prevented from cracking or breaking when the components within gasket frames 5a are expanded in a high-temperature environment or the collectors 2d are unduly pulled or compressed.

In the basic cells 6a, 6b in the first and second embodiments, collectors 2b, 2c may be attached to the gasket frames 5a such that collectors 2b, 2c are slackened between the portions held against the polarizable electrode 1a and the portions held against the gasket frame 5a. In this manner, the productivity and reliability of electric double-layer capacitors are further increased.

4th Embodiment

FIG. 9 shows a cell stack 9d comprising two stacked basic cells 6d of an electric double-layer capacitor according to a fourth embodiment of the present invention. The electric double-layer capacitor according to the fourth embodiment differs from the electric double-layer capacitor according to the first embodiment with respect to the outermost collectors of the cell stack and the polarizable electrodes held against the outermost collectors.

The parts of the cell stack 9c shown in FIG. 9 which are identical to those of the first embodiment are denoted by identical reference characters. Only the details of cell stack 9d which are different from the first embodiment will be described below.

As shown in FIG. 9, collectors 2a are attached to the opposite surfaces of gasket frames 5a, and disposed on the outermost surfaces of cell stack 9d. Each outermost collector 2a comprises a single sheet. Each basic cell 6d comprises separator 4 and a pair of polarizable electrodes 1a, 1b confronting each other with separator 4 interposed therebetween. Polarizable electrodes 1b are positioned closely to the outermost collectors 2a of the cell stack 9d and held in contact with the outermost collectors 2a. The surfaces of polarizable electrodes 1b are held against the outermost collectors 2a and their outer edges are beveled.

As shown in FIGS. 10A, 10B, and 10C, the outer edges of the surfaces of polarizable electrodes 1b held in contact with the outermost collectors 2a are beveled. Each polarizable electrode 1b has the same outer dimensions as polarizable electrodes 1a, and has a length of 70 mm, a width of 50 mm, and a thickness of 5 mm.

Polarizable electrodes 1b having outer edges beveled to 0.3, 0.4, 0.5, 0.6, and 1.0 mm are fabricated, 16 basic cells 6 are stacked in series, and two basic cells 6d are disposed on respective opposite ends of the stack of the basic cells 6 to make up a cell stack having a dielectric strength of 15 V. Basic cells 6d are stacked such that the collectors 2a held against the polarizable electrodes 1b are positioned on the outermost surfaces of the stack of the basic cells 6. Terminal electrodes 8 and pressure plates 7 are attached to the opposite ends of the cell stack, thereby completing the electric double-layer capacitor according to the fourth embodiment.

Since the outer edges of the surfaces of the polarizable electrodes 1b which are held against the outermost collectors 2a are beveled, collectors 2a are prevented from cracking or breaking in contact with the beveled outer edges. Particularly when a cell stack is pressed by pressure plates, the beveled outer edges of the polarizable electrodes 1b do not damage collectors 2a.

5th Embodiment

Figure 11A:
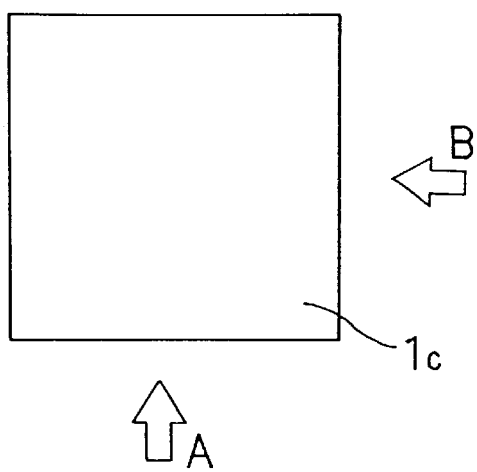
FIG. 11A is a plan view of a polarizable electrode of an electric double-layer capacitor according to a fifth embodiment of the present invention.
Figure 11B:
FIG. 11B is a side elevational view as viewed in the direction indicated by the arrow A in FIG. 11A.
Figure 11C:
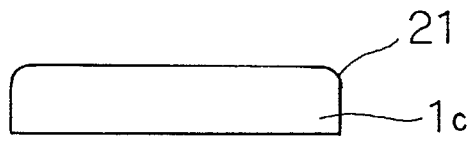
FIG. 11C is a side elevational view as viewed in the direction indicated by the arrow B in FIG. 11A.

The polarizable electrode shown in FIGS. 11A, 11B, and 11C is used in an electric double-layer capacitor according to a fifth embodiment of the present invention. The electric double-layer capacitor according to the fifth embodiment differs from the electric double-layer capacitor according to the fourth embodiment with regard to the polarizable electrodes held against the outermost collectors of the cell stack.

The electric double-layer capacitor according to the fifth embodiment employs the polarizable electrode 1c shown in FIGS. 11A, 11B, and 11C in place of the polarizable electrodes 1b in the basic cells 6d according to the fourth embodiment. As shown in FIGS. 11A, 11B, and 11C, polarizable electrode 1c has a surface whose all edges comprise round edges 21 and is held against the outermost collector of the cell stack. Polarizable electrode 1c differs from the polarizable electrode according to the fourth embodiment in that all the outer edges of one surface thereof are rounded, rather than beveled. Polarizable electrode 1c has the same outer dimensions as those of the polarizable electrode 1b, i.e., has a length of 70 mm, a width of 50 mm, and a thickness of 5 mm.

Polarizable electrodes 1c having outer edges rounded to radii of curvature of 0.3, 0.4, 0.5, 0.6, and 1.0 mm are fabricated, 16 basic cells 6 are stacked in series, and two basic cells having polarizable electrodes 1c are disposed on respective opposite ends of the stack of the basic cells 6 to make up a cell stack having a dielectric strength of 15 V. The basic cells are stacked such that the collectors held against the polarizable electrodes 1c are positioned on the outermost surfaces of the stack of basic cells 6. Terminal electrodes 8 and pressure plates 7 are attached to the opposite ends of the cell stack, thereby completing the electric double-layer capacitor according to the fifth embodiment.

Since the outer edges of the surfaces of the polarizable electrodes 1c held against the outermost collectors 2a are rounded, collectors 2a are prevented from cracking or breaking in contact with the rounded outer edges. Particularly when the cell stack is pressed by the pressure plates, the rounded outer edges of the polarizable electrodes 1c do not damage collectors 2a.

6th Embodiment

An electric double-layer capacitor according to a sixth embodiment is similar to the electric double-layer capacitor according to the first embodiment except that polarizable electrodes 1b whose outer edges are beveled according to the fourth embodiment are employed in place of the polarizable electrodes held against the outermost collectors of the cell stack of the electric double-layer capacitor according to the first embodiment. Therefore, the electric double-layer capacitor according to the sixth embodiment has collectors 2b, each comprising two laminated collector sheets 10a, disposed on the outermost surfaces of the cell stack. The surfaces of the polarizable electrodes 1b having beveled outer edges are held against the outermost collectors 2b of the cell stack. The outer edges of the surfaces of polarizable electrodes 1b are beveled 0.5 mm.

7th Embodiment

Figure 12:
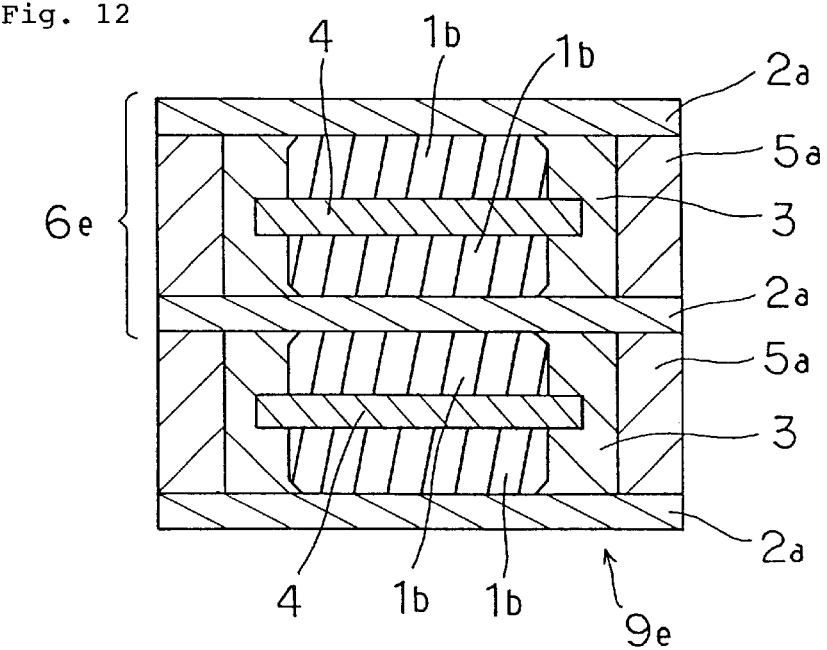
FIG. 12 is a cross-sectional view of two basic cells of an electric double-layer capacitor according to a seventh embodiment of the present invention.

FIG. 12 shows cell stack 9e comprising two stacked basic cells 6e of an electric double-layer capacitor according to the seventh embodiment of the present invention.

The parts of cell stack 9e shown in FIG. 12 which are identical to those of the fourth embodiment are denoted by identical reference numbers. Only the details of cell stack 9e different from the fourth embodiment will be described below.

As shown in FIG. 12, each basic cell 6e is similar to the basic cells 6d in the fourth embodiment except that polarizable electrodes 1b are employed in place of polarizable electrodes 1a. Therefore, two polarizable electrodes 1b are disposed in confronting relationship to each other with separator 4 interposed therebetween between gasket frames 5a. Each polarizable electrode 1b has a surface whose outer edges are beveled and which is held against collector 2a. The outer edges of the surfaces of the polarizable electrodes 1b are beveled to 0.5 mm.

18 basic cells 6e are stacked in series, and terminal electrodes 8 and pressure plates 7 are attached to opposite ends of the stack of the basic cells 6e.

Because the outer edges of the surfaces of the polarizable electrodes 1b held against collectors 2a are beveled, not only the outermost collectors 2a, but also the collectors 2a within the cell stack are prevented from cracking or breaking due to contact with the outer edges of the polarizable electrodes 1b.

8th Embodiment

Figure 13:
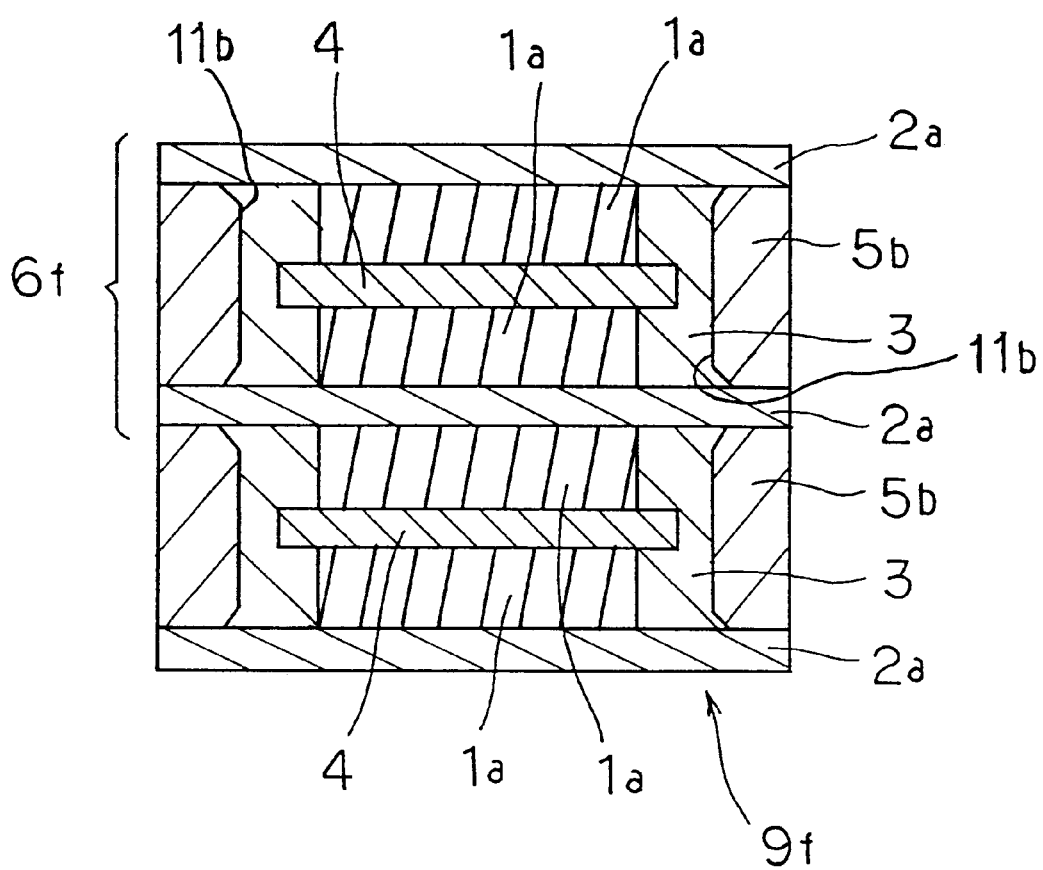
FIG. 13 is a cross-sectional view of two basic cells of an electric double-layer capacitor according to an eighth embodiment of the present invention.

FIG. 13 shows a cell stack 9f comprising two stacked basic cells 6f of an electric double-layer capacitor according to an eighth embodiment of the present invention. The electric double-layer capacitor according to the eighth embodiment differs from the electric double-layer capacitor according to the first embodiment with regard to the gasket frames housing the polarizable electrodes and separators and the outermost collectors of a cell stack. The parts of the cell stack 9f shown in FIG. 13 which are identical to those of the first embodiment are denoted by identical reference numbers. Only the details of cell stack 9f which are different from the first embodiment will be described below.

As shown in FIG. 13, each basic cell 6f comprises a pair of polarizable electrodes 1a and separator 4 which are housed between gasket frame 5b. The space between gasket frame 5b has the dimensions as gasket frame 5a in the first embodiment, i.e., a length of 74 mm, a width of 54 mm, and a thickness of 10.2 mm.

Collectors 2a are joined to gasket frame 5a in contact with the polarizable electrodes 1a. Therefore, collectors 2a are disposed on the outermost surfaces of the cell stack 9f. All the inner edges of surfaces of gasket frames 5b held against the collectors 2a are beveled.

Figure 14A:
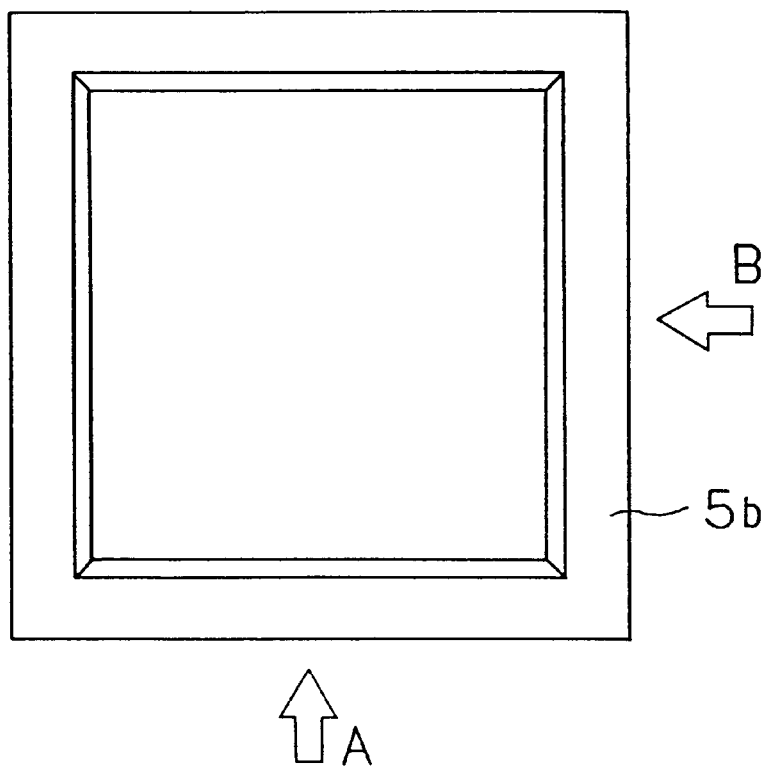
FIG. 14A is a plan view of a gasket frame of a cell stack shown in FIG. 13.
Figure 14B:
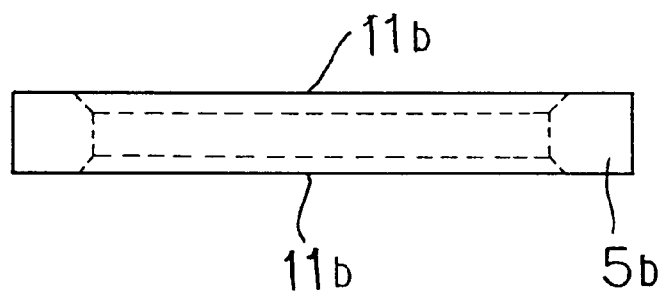
FIG. 14B is a side elevational view as viewed in the direction indicated by the arrow A in FIG. 14A.
Figure 14C:
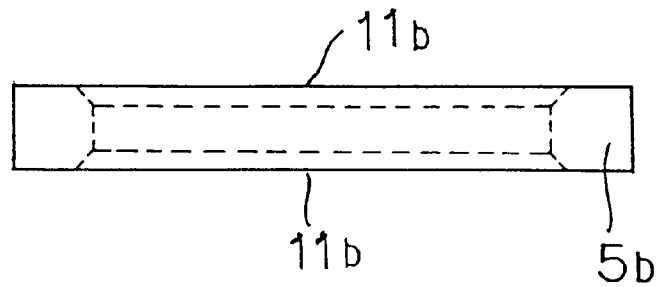
FIG. 14C is a side elevational view as viewed in the direction indicated by the arrow B in FIG. 14A.

As shown in FIGS. 14A, 14B, and 14C, each gasket frame 5b has all its inner edges beveled around one of the openings 11b, and also has all inner edges beveled around the other opening 11b. The inner edges of gasket frames 5b are beveled 0.5 mm.

18 basic cells 6f are stacked in series, and terminal electrodes 8 and pressure plates 7 are attached to the opposite ends of the stack of basic cells 6f.

Because the inner edges of the surfaces of gasket frames 5b held against collectors 2a are beveled, collectors 2a are prevented from cracking or breaking due to contact with the inner edges of gasket frames 5b. Particularly when the cell stack is pressed by the pressure plates, the beveled inner edges of gasket frames 5b do not damage collectors 2a.

9th Embodiment

Figure 15A:
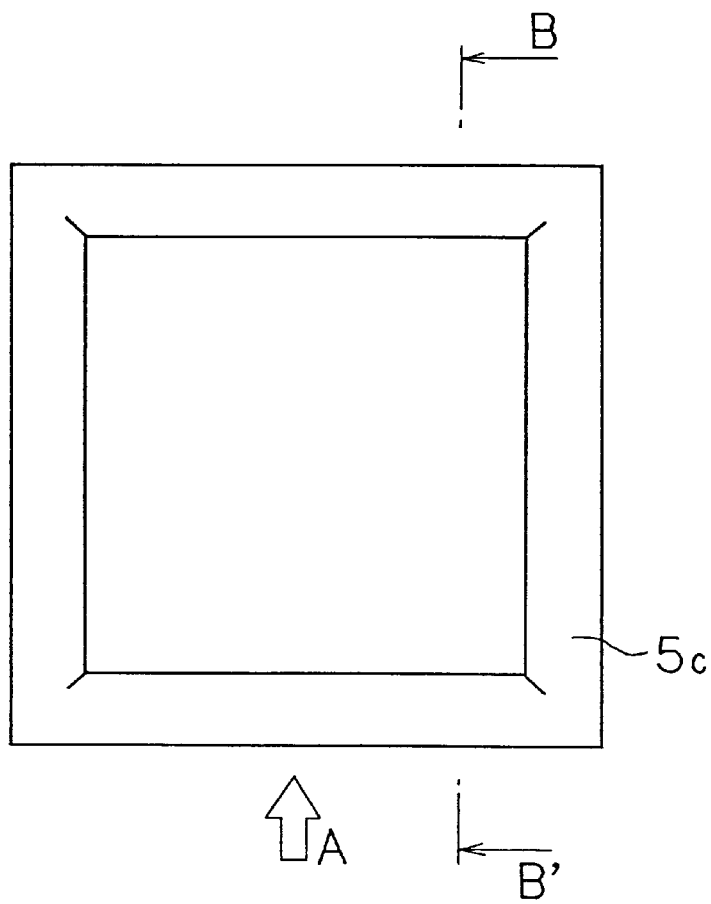
FIG. 15A is a plan view of a gasket frame of an electric double-layer capacitor according to a ninth embodiment of the present invention.
Figure 15B:
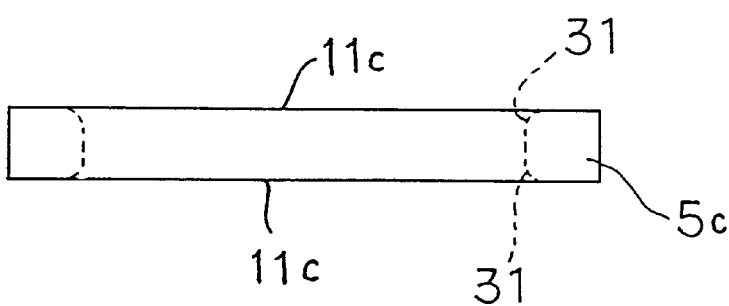
FIG. 15B is a side elevational view as viewed in the direction indicated by the arrow A in FIG. 15A.
Figure 15C:
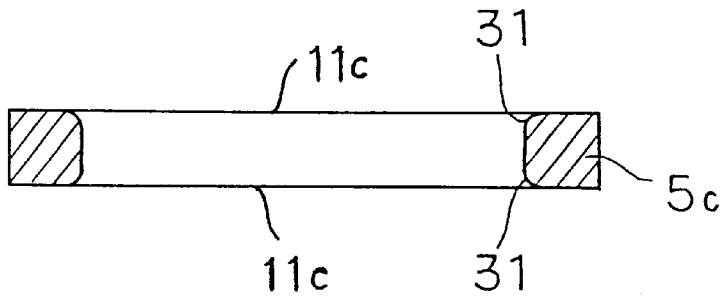
FIG. 15C is a cross-sectional view taken along line B–B' of FIG. 15A.

The gasket frame shown in FIGS. 15A, 15B, and 15C is used in an electric double-layer capacitor according to a ninth embodiment of the present invention. The electric double-layer capacitor according to the ninth embodiment differs from the electric double-layer capacitor according to the eighth embodiment in that the gasket frame 5c shown in FIGS. 15A, 15B, and 15C is used in place of the gasket frames 5b in the eighth embodiment.

As shown in FIGS. 15A, 15B, and 15C, gasket frame 5c has an outer shape substantially similar to that of gasket frames 5a, 5b. Gasket frame 5c has one surface with all inner edges 31 rounded around one of openings 11c defined therein and the opposite surface with all inner edges 31 rounded around the other opening 11c defined therein. Edges 31 are rounded to a radius of curvature of 0.5 mm. Gasket frame 5c differs from the gasket frame 5b in the eighth embodiment in that all the inner edges of the surface thereof held against collector 2a are rounded, rather than beveled. The space between gasket frame 5c has the same dimensions as gasket frame 5b in the eighth embodiment, i.e., has a length of 74 mm, a width of 54 mm, and a thickness of 10.2 mm.

The electric double-layer capacitor according to the ninth embodiment comprises 18 basic cells, each having a gasket frame 5c, stacked in series and with terminal electrodes 8 and pressure plates 7 attached to opposite ends of the stack of basic cells.

Since the inner edges of the surfaces of gasket frame 5c held against collectors 2a comprise rounded edges 31, collectors 2a are prevented from cracking or breaking in contact with the rounded outer edges. Particularly when the cell stack is pressed by the pressure plates, the rounded inner edges of gasket frames 5c do not damage collectors 2a.

The present invention is not limited to the electric double-layer capacitors according to the first through ninth embodiments, but covers electric double-layer capacitors based on combinations of the features according to the first through ninth embodiments.

In order to evaluate the electric double-layer capacitors according to the first through ninth embodiments for the percentage of defective products, initial characteristics of the equivalent series resistance (ESR), and service life, electric double-layer capacitors according to Comparative Examples 1 through 4 are used. Electric double-layer capacitors according to Comparative Examples 1 through 4 will be described below.

COMPARATIVE EXAMPLE 1

Figure 16:
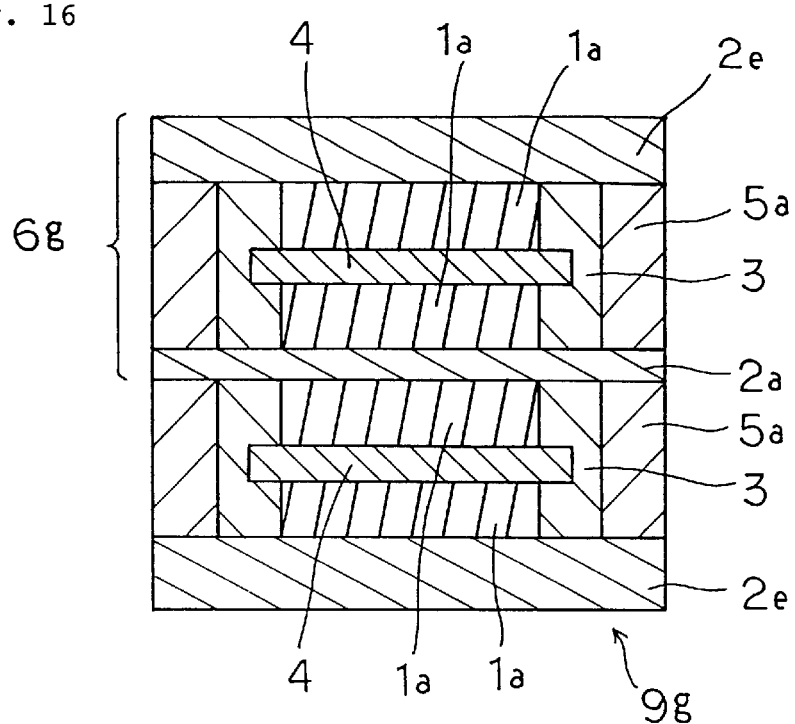
FIG. 16 is a cross-sectional view of two basic cells of an electric double-layer capacitor according to Comparative Example 1.

FIG. 16 shows cell stack 9g comprising two basic cells 6g of the electric double-layer capacitor according to Comparative Example 1. The electric double-layer capacitor according to Comparative Example 1 differs from the electric double-layer capacitor in the first embodiment in that the outermost collectors of the cell stack are thicker than the collectors within the cell stack.

The parts of the cell stack 9g shown in FIG. 16 identical to those of the first embodiment are denoted by identical reference numbers. Only the details of cell stack 9g which are different from the first embodiment will be described below.

As shown in FIG. 16, collectors 2e are disposed on the outermost surfaces of cell stack 9g. Each of collectors 2e has a length of 82 mm, a width of 62 mm, and a thickness of 0.2 mm. Therefore, the thickness of each of the collectors 2e is twice the thickness (0.1 mm) of collector 2a in cell stack 9g.

In Comparative Example 1, 16 basic cells 6 are stacked in series with each other, and two basic cells 6f are disposed on the opposite ends of the stack of basic cells 6, making up a cell stack. Basic cells 6g are stacked such that collectors 2e are positioned on the outermost surfaces of the stack of basic cells 6. Terminal electrodes 8 and pressure plates 7 are attached to the opposite ends of the cell stack, thereby completing the electric double-layer capacitor according to Comparative Example 1.

As described above, the electric double-layer capacitor according to Comparative Example 1 has outermost collectors thicker than the collectors within the cell stack for achieving increased mechanical strength to maintain a desired level of productivity and reliability of the electric double-layer capacitor.

COMPARATIVE EXAMPLE 2

An electric double-layer capacitor according to Comparative Example 2 is similar to the electric double-layer capacitor according to Comparative Example 1 except that an electrically conductive polyethylene film fabricated by filling carbon black with polyethylene at successively different densities is used in place of collectors 2e of the electric double-layer capacitor according to Comparative Example 1. Specifically, the polyethylene in the electrically conductive polyethylene film is provided in three layers having successively low, high, and low densities across the thickness of the electrically conductive polyethylene film. The high-density layer of polyethylene has a thickness of 50 $\mu$m, and each of the low-density layers of polyethylene has a thickness of 15 $\mu$m.

COMPARATIVE EXAMPLE 3

Figure 17:
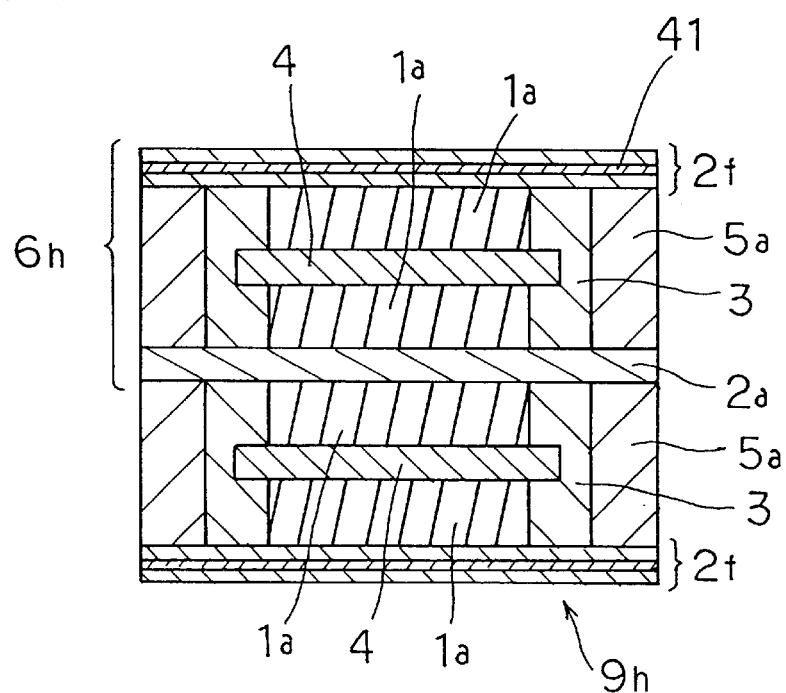
FIG. 17 is a cross-sectional view of two basic cells of an electric double-layer capacitor according to Comparative Example 3.

FIG. 17 shows cell stack 9h comprising two stacked basic cells 6h of an electric double-layer capacitor according to Comparative Example 3. The electric double-layer capacitor according to Comparative Example 3 differs from the electric double-layer capacitor according to Comparative Example 1 in that a collector comprising an electrically conductive sheet with a core in the form of an aluminum foil embedded therein is used in place of collectors 2e of the electric double-layer capacitor according to Comparative Example 1.

As shown in FIG. 17, collectors 2f are disposed on the outermost surfaces of cell stack 9h of the electric double-layer capacitor according to Comparative Example 3. Each of the collectors 2f comprises an electrically conductive sheet and an aluminum foil 41 having a thickness of 50 $\mu$m and is embedded as a core in the electrically conductive sheet.

COMPARATIVE EXAMPLE 4

An electric double-layer capacitor according to Comparative Example 4 is similar to the electric double-layer capacitor according to Comparative Example 1 in that a collector comprising an electrically conductive sheet with an embedded core in the form of an electrically conductive synthetic resin layer is used in place of collectors 2e of the electric double-layer capacitor in Comparative Example 1.

The electric double-layer capacitors according to the first through ninth embodiments and the electric double-layer capacitors according to Comparative Examples 1 through 4 were measured for the percentage of defective products and initial characteristics of the equivalent series resistance, and also tested for reliability. The results of the measurement and the test will be described below.

The initial characteristics of the equivalent series resistance (ESR) of the electric double-layer capacitors are expressed as proportions with respect to an initial value (=1) of the equivalent series resistance of the electric double-layer capacitor according to Comparative Example 1.

The electric double-layer capacitors were tested for reliability by applying a voltage of 15 V to the electric double-layer capacitors at a high temperature of 70° C. and leaving the electric double-layer capacitors to stand for 1000 hours while the voltage was being applied at a high temperature. Thereafter, the electric double-layer capacitors were sufficiently discharged, and measured for equivalent series resistance. The initial value of the equivalent series resistance is represented by E, and a change or difference between the equivalent series resistance before the electric double-layer capacitors were left standing at a high temperature and the equivalent series resistance after they were discharged is represented by $\Delta E$. The reliability of the electric double-layer capacitors was evaluated on the basis of the percentage $\Delta E/E$ (%).

For further evaluation of the reliability of the electric double-layer capacitors, the average service life of the electric double-layer capacitor according to Comparative Example 1 was assumed to be "1", and the relative average service life of each of the electric double-layer capacitors other than Comparative Example 1 with respect to the average service life of the electric double-layer capacitor according to Comparative Example 1 was determined. The relative average service life of each of the electric double-layer capacitors was determined by repeatedly applying a voltage of 15 V to the electric double-layer capacitor at the high temperature of 70° C. and leaving the electric double-layer capacitor to stand for a certain period of time while the voltage was being applied at the high temperature. A period of time consumed until each of the electric double-layer capacitors failed to operate was measured, and the measured period was recorded on a Weibull probability plot for thereby determining the average service life of the electric double-layer capacitor.

The equivalent series resistance of each of the electric double-layer capacitors was measured by measuring the impedance thereof at a test signal frequency of 1 kHz according to an AC four-terminal method, and calculating the real part of the impedance.

50 samples were prepared for each of the electric double-layer capacitors according to the first through third embodiments, the sixth through ninth embodiments, and Comparative Examples 1 through 4. With respect to the fourth embodiment, 50 samples were prepared for each of the electric double-layer capacitors in which the outer edges of the polarizable electrodes 1b were beveled 0.3, 0.4, 0.5, 0.6, and 1.0 mm. With respect to the fifth embodiment, 50 samples were prepared for each of the electric double-layer capacitors in which the edges 21 of the polarizable electrodes 1c were rounded to radii of curvature of 0.3, 0.4, 0.5, 0.6, and 1.0 mm. The characteristic values of each of the electric double-layer capacitors were calculated as averages of the 50 samples.

The results of the measurement of the percentage of defective products and initial characteristics of the equivalent series resistance and the reliability test of the electric double-layer capacitors according to the first through ninth embodiments and the electric double-layer capacitors according to Comparative Examples 1 through 4 are set forth in Table shown below.

TABLE 1

|  | Defects (%) | Initial ESR | ΔE/E (%) | Relative average life |
|---|---|---|---|---|
| 1st Embodiment | 0 | 0.8 | 3.8 | 10.3 |
| 2nd Embodiment | 0 | 0.8 | 4.2 | 9.5 |
| 3rd Embodiment | 10 | 0.9 | 12.2 | 5.9 |
| 4th Embodiment Beveled | | | | |
| 0.3 mm | 72 | 0.9 | 88.1 | 0.5 |
| 0.4 mm | 38 | 0.9 | 42.1 | 0.9 |
| 0.5 mm | 2 | 1 | 10.8 | 5.3 |
| 0.6 mm | 0 | 0.9 | 11.1 | 6 |
| 1.0 mm | 2 | 1 | 10.5 | 5.8 |
| 5th Embodiment Rounded | | | | |
| 0.3 mm | 68 | 1 | 76.3 | 0.6 |
| 0.4 mm | 32 | 1.1 | 35.6 | 0.8 |
| 0.5 mm | 0 | 0.9 | 9.8 | 5.7 |
| 0.6 mm | 2 | 0.9 | 10.7 | 5.4 |
| 1.0 mm | 0 | 0.9 | 11.6 | 5.5 |
| 6th Embodiment | 0 | 0.9 | 1.8 | 11.9 |
| 7th Embodiment | 6 | 1 | 8.6 | 6.1 |
| 8th Embodiment | 4 | 1 | 12.3 | 5.8 |
| 9th Embodiment | 2 | 1.1 | 11.7 | 5.9 |
| Comparative Example 1 | 28 | 1 | 58.3 | 1 |
| Comparative Example 2 | 32 | 0.8 | 55 | 1.1 |
| Comparative Example 3 | 20 | 2.2 | 46.1 | 1.9 |
| Comparative Example 4 | 16 | 1.9 | 39.7 | 2 |

First, the electric double-layer capacitors according to Comparative Examples 1 through 4 will be evaluated below. The percentages of defective products of the electric double-layer capacitors according to Comparative Examples 1 through 4 are in the poor range from 16 to 32%. The initial characteristics of the equivalent series resistance of the electric double-layer capacitors according to Comparative Examples 3 and 4 are of poor values, i.e., about twice the initial characteristics of the equivalent series resistance of the electric double-layer capacitor according to Comparative Example 1. The ratios ΔE/E (%) of electric double-layer capacitors according to Comparative Examples 1 through 4 are also of poor values ranging from about 40 to 60%. The average service lives of the electric double-layer capacitors according to Comparative Examples 2 and 3 are improved by about twice that of the electric double-layer capacitor according to Comparative Example 1.

Except for the samples of the fourth embodiment in which the edges were beveled by 0.3 mm and 0.4 mm and the samples of the fifth embodiment where the edges were rounded to the radii of curvature of 0.3 mm and 0.4, the productivity of the electric double-layer capacitors according to the first through ninth embodiments was increased, and the reliability thereof was maintained. Those electric double-layer capacitors with increased productivity and the maintained reliability will be described below.

The percentages of defective products of the electric double-layer capacitors according to the first through ninth embodiments are in the range from about 2 to 10%. Therefore, almost no defective products were manufactured according to the first through ninth embodiments. The initial characteristics of the equivalent series resistance of the electric double-layer capacitor according to the first through ninth embodiments are negligibly small, and exhibit high stability. The ratios ΔE/E of the electric double-layer capacitors according to the first through ninth embodiments were in a stable range, from about 2 to 12%, and the relative service lives thereof were highly improved, i.e., about 5 to 11 times the relative service lives of the electric double-layer capacitors according to Comparative Examples 1 through 4. The above evaluations do not apply to the samples of the fourth embodiment where the edges were beveled 0.3 mm and 0.4 mm and the samples of the fifth embodiment where the edges were rounded to the radii of curvature of 0.3 mm and 0.4 for the following reasons:

Usually, a collector is broken if it is not rigid and is poor in mechanical strength. When a weak collector and a polarizable electrode are pressed against each other in order to lower the contact resistance between the collector and the polarizable electrode, the pressure tends to be irregularly applied to the collector, breaking it in a region where it is strongly pressed.

A collector is also broken if a polarizable electrode or a gasket frame held in contact with the collector has a sharp edge. When a collector is pressed by the sharp edge of the polarizable electrode or a gasket, it is liable to crack or break. Therefore, beveled or rounded edges of the polarizable electrode need to be of such an extent not to damage the collector. If the extent of the beveled edges or the radii of curvature of the rounded edges are less than 0.5 mm, the extent of the beveled edges or the radii of curvature are not effective enough to prevent damage to the collector, and collector tends to crack when pressed by the edges of polarizable electrodes. Therefore, if the extent of the beveled edges or the radii of curvature of the rounded edges are less than 0.5 mm, the percentage of defective products and the reliability of the electric double-layer capacitors are not improved.

With the electric double-layer capacitors according to the first through ninth embodiments, almost no defective products were produced, and the relative average service lives were greatly improved. Particularly, the electric double-layer capacitors with outermost collectors comprising two laminated collector sheets were highly effective in preventing the production defective products and improving average service life. The reasons for this will be described below.

In the electric double-layer capacitors according to the first through ninth embodiments and Comparative Examples 1 through 4, the cell stacks are always kept under pressure. Since collectors 2e, 2f of the electric double-layer capacitors according to Comparative Examples 1 through 4 are in the form of a single sheet no matter how thick, if the collector happens to crack somewhere therein, the crack gradually develops to such an extent that it will eventually allow the electrolytic solution to leak out of the basic cell. However, if a collector comprises two collector sheets as does the electric double-layer capacitor according to the first embodiment, even if one of the collector sheets happens to crack, the electrolytic solution is prevented from leaking out of the basic cell if no crack occurs in the other collector sheet. There is almost no possibility that both collector sheets will crack at the same time. When the samples of the electric double-layer capacitor according to the first embodiment were tested, it was found that collector sheet of collector 2b of some of the samples was developing a crack, but no sample with a crack developing was in the other collector sheet.

While preferred embodiments of the present invention have been described using specific terms, such description is for illustrative purposes only, and it is to be understood that changes and variations may be made without departing from the spirit or scope of the following claims.

What is claimed is:

1. An electric double-layer capacitor comprising:
    a porous, electrically non-conductive, ion-permeable separator impregnated with an electrolytic solution;
    a pair of polarizable electrodes disposed in confronting relation with the separator interposed therebetween;
    a gasket frame housing said separator and said pair of polarizable electrodes; and
    a lamination of at least two collector sheets held against a surface of said pair of polarizable electrodes facing away from said separator and attached to said gasket frame to seal said pair of polarizable electrodes and said separator within, wherein each of said laminated collector sheets is made of the same material and each of said laminated collector sheets is in direct contact with material over at least one common surface.

2. An electric double layer capacitor according to claim 1, wherein said lamination is slackened in an area between one of said polarizable electrodes and said gasket frame housing.

3. An electric double-layer capacitor according to claim 1, wherein the surface of one of said polarizable electrodes has beveled outer edges.

4. An electric double-layer capacitor according to claim 1, wherein a surface of one of said polarizable electrodes has rounded outer edges.

5. An electric double-layer capacitor according to claim 1, wherein said gasket frame has a surface held against said lamination and beveled inner edges.

6. An electric double-layer capacitor according to claim 1, wherein said gasket frame has a surface held against said lamination and rounded inner edges.

7. An electric double-layer capacitor comprising:
    a stack of basic cells;
    each of said basic cells comprising:
    a porous, electrically non-conductive, ion-permeable separator impregnated with an electrolytic solution;
    a pair of polarizable electrodes disposed in confronting relation with the separator interposed therebetween;
    a gasket frame housing said separator and said pair of polarizable electrodes; and
    a lamination of at least two collector sheets held against a surface of said pair of polarizable electrodes facing away from said separator and attached to said gasket frame to seal said pair of polarizable electrodes and said separator within;
    said stack including outermost laminations of at least two collector sheets, wherein each of said laminated collector sheets is made of the same material and each of said laminated collector sheets is in direct contact with an adjacent collector sheet over at least one common surface.

8. An electric double-layer capacitor according to claim 7, wherein said two or more laminated collector sheets of each of said outermost laminations are identical to the laminations in said stack, and integrally laminated by pressing.

9. An electric double-layer capacitor according to claim 7, wherein said two or more laminated collector sheets of each of said outermost laminations have different thicknesses, and are integrally laminated by pressing.

10. An electric double layer capacitor according to claim 7, wherein each of said outermost laminations is larger than the lamination in said stack, and slackened in an area between one of said polarizable electrodes and said gasket frame housing.

11. An electric double-layer capacitor according to claim 7, wherein the surface of one of said polarizable electrodes which is held against one of the outermost laminations has outer edges beveled.

12. An electric double-layer capacitor according to claim 11, wherein the surface of said polarizable electrode held against one of the outermost laminations has its outer edges beveled at least 0.5 mm.

13. An electric double-layer capacitor according to claim 7, wherein the surface of one of said polarizable electrodes held against one of the outermost laminations has rounded outer edges.

14. An electric double-layer capacitor according to claim 13, wherein the surface of said polarizable electrode held against one of the outermost laminations has outer edges rounded to a radius of curvature of at least 0.5 mm.

15. An electric double-layer capacitor according to claim 7, wherein said gasket frame has a surface held against one of said outermost laminations and having beveled inner edges.

16. An electric double-layer capacitor according to claim 7, wherein said gasket frame has a surface held against one of said outermost laminations and having rounded inner edges.

17. An electric double-layer capacitor comprising:
    a plurality of porous, electrically non-conductive, ion-permeable separators, each separator being sandwiched between a pair of polarizable electrodes, wherein one electrode of said pair of polarizable electrodes corresponding to each separator is designated as a top electrode and the other electrode of said pair is designated as a bottom electrode;
    a plurality of interim collectors, each interim collector comprising at least one single collector sheet and being disposed between the bottom electrode corresponding to one of said separators and the top electrode corresponding to another of said separators different than said one of said separators;
    electrolytic solution in contact with, and impregnating, said porous, electrically non-conductive, ion-permeable separators;
    a gasket frame surrounding said separators and said polarizable electrodes; and
    two end laminations of at least two collector sheets in contact with only one of said polarizable electrodes, wherein each of said laminated collector sheets is made of the same material and each of said laminated collector sheets is in direct contact with an adjacent collector sheet over at least one common surface.

* * * * *